POULTRY HOUSE CURTAIN CONTROLLER

Filed Jan. 22, 1968 3 Sheets-Sheet 1

INVENTOR
JAMES PHILIP THOMASON
BY Newton, Hopkins,
Jones & Ormsby
ATTORNEYS

Oct. 28, 1969 J. P. THOMASON 3,474,761

POULTRY HOUSE CURTAIN CONTROLLER

Filed Jan. 22, 1968 3 Sheets-Sheet 2

Oct. 28, 1969 J. P. THOMASON 3,474,761

POULTRY HOUSE CURTAIN CONTROLLER

Filed Jan. 22, 1968 3 Sheets-Sheet 3

United States Patent Office 3,474,761
Patented Oct. 28, 1969

3,474,761

POULTRY HOUSE CURTAIN CONTROLLER

James Philip Thomason, Jasper, Ga. 30143

Continuation-in-part of application Ser. No. 559,764, June 23, 1966. This application Jan. 22, 1968, Ser. No. 699,416
Int. Cl. A01k *31/18*
U.S. Cl. 119—21 6 Claims

ABSTRACT OF THE DISCLOSURE

A poultry house curtain controller comprising an upwardly extending threaded shaft having pulleys connected thereto for controlling the lines connected to the poultry house curtains. A motor rotates the shaft to raise or lower the pulleys and thus the curtains. The shaft is driven at a slow speed, and the direction in which the motor is driven is controlled by the temperature in the poultry house.

CROSS REFERENCE TO RELATED APPLICATIONS

This application is a continuation-in-part of my copending application Ser. No. 559,764, filed June 23, 1966, for "Poultry House Curtain Raiser."

BACKGROUND OF THE INVENTION

In the poultry industry the temperature conditions within the poultry house are usually maintained by constructing the poultry house with at least one wall being opened to the atmosphere, with only a screen extending across the opening. A substantially impervious curtain is connected to the wall of the poultry house which can be raised or lowered to close or open the wall opening to the atmosphere, thus controlling the ventilation and heat in the poultry house. It is sometimes necessary to raise and lower the curtain as much as fifteen times in a twenty-four hour period in order to maintain the temperatures desired and properly ventilate the poultry house to avoid the build-up of ammonia gas within the poultry house.

Until recently, the poultry house curtains were raised manually, usually with a winch. Of course, this technique required the constant attention of a workman, and was expensive, time consuming, and the temperature and ventilation of the poultry house was poorly controlled. Recently, automatic controls have been applied to the conventional winch, so that the winch could be automatically operated upon temperature changes at frequent intervals. The controls usually embodied a motor, a thermostat, and a timer. The motor was connected to the winch, and at intervals determined by the timer, thermostat would sense the temperature within the poultry house and energize the motor if the temperature happened to be above or below the desired temperature within the poultry house. While this arrangement has been satisfactory to some extent in controlling the positions of the curtains within the poultry house, the presence of the timer in the control system has created maintenance problems, and caused the initial cost of the system to be excessive. Since the air within a typical poultry house is somewhat contaminated with impurities, automatic timers are particularly susceptible to becoming fouled with the impurities or debris, and to rust and corrode, and because of the number of moving parts present in a timer the accuracy of coaction of the moving parts with one another is critical.

SUMMARY OF THE INVENTION

This invention relates to a poultry house curtain controller that does not require the presence of a timer in the control system. Pulleys are connected to an upwardly extending threaded shaft, and lines are extended about the pulleys and connected to the curtains of the poultry house. A motor rotates the threaded shaft to raise or lower the pulleys, thus lowering or raising the curtains. The operation of the motor is such that the threaded shaft is rotated at approximately 5 r.p.m., and the number of threads on the threaded shaft is six threads per inch. Thus, when the motor is energized, the pulleys will be moved ⅚ of an inch in one minute's time. This results in the curtains being raised or lowered at slightly less than two inches per minute. Because of the slow rate at which the curtains are moved, the motor is operated continuously, without a timer, until the proper temperature conditions within the poultry house are attained.

Thus, it is an object of this invention to provide an easily constructed, economical, virtually maintenance free automatic curtain adjusting assembly for use in poultry houses.

Another object of this invention is to provide an automatic curtain adjusting assembly for poultry houses wherein the curtain is raised or lowered at a slow rate of speed until the desired temperature conditions within the poultry house are attained.

Other objects, features and advantages of the present invention will become apparent upon reading the following specification, when taken in conjunction with the accompanying drawing.

DESCRIPTION OF THE PREFERRED EMBODIMENT

Figure 1:
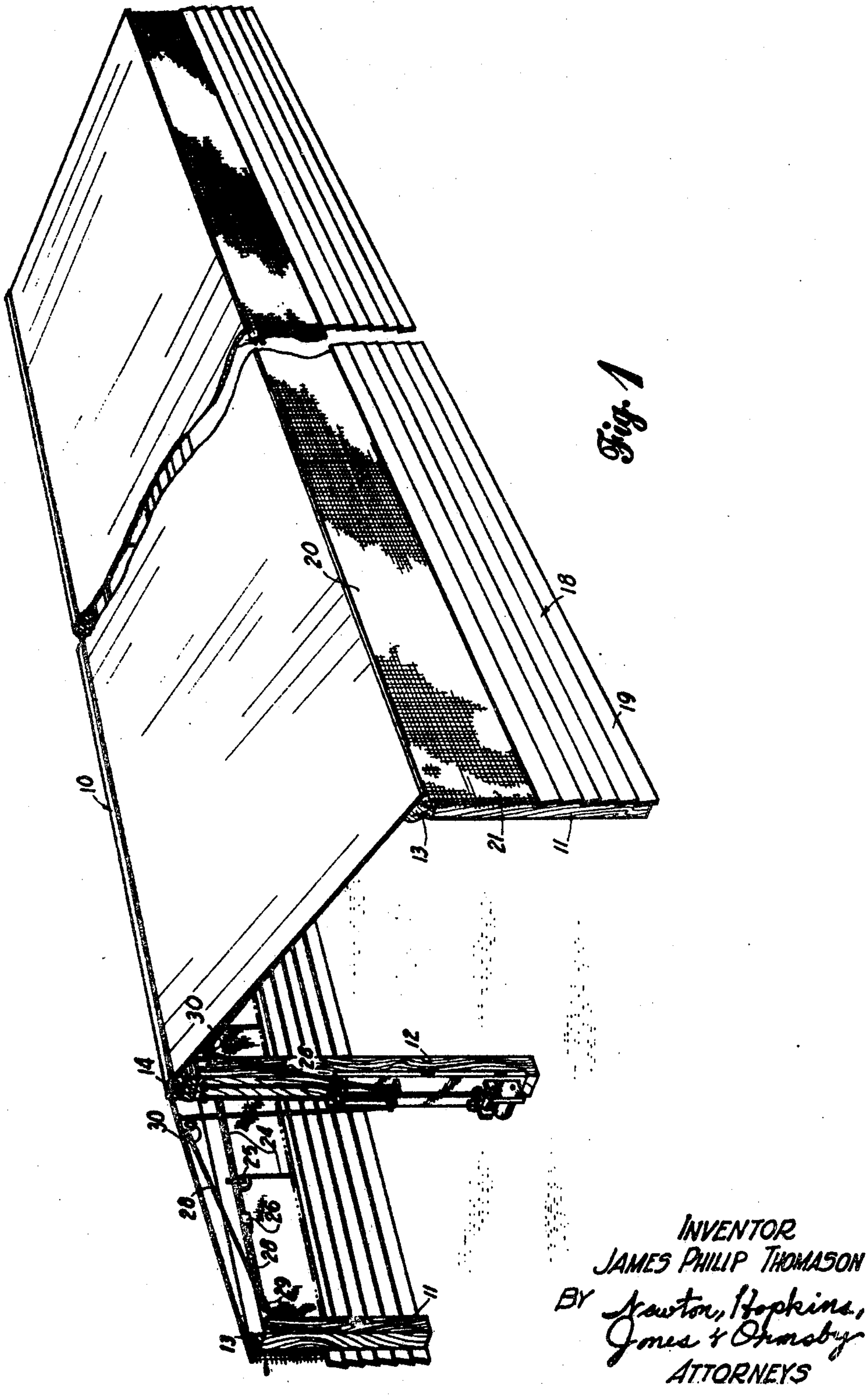
FIG. 1 is a perspective view of a poultry house, with one end broken away to show the automatic curtain control apparatus and pulleys and lines associated therewith.
Figure 2:
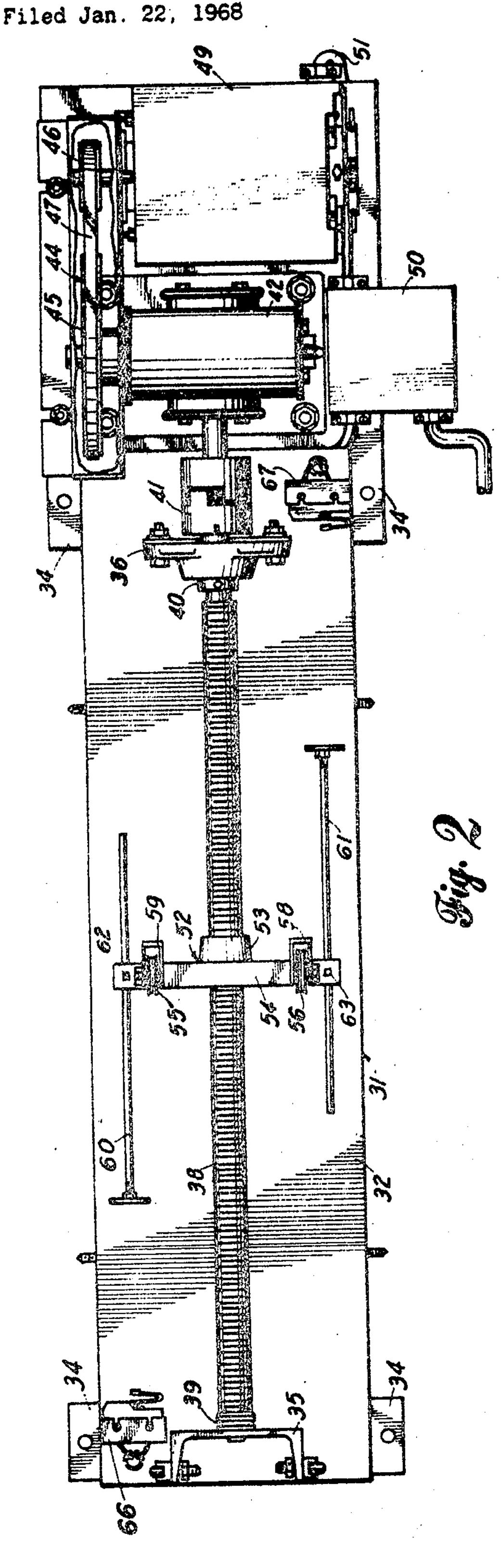
FIG. 2 is a front-elevational view of the curtain control apparatus, with the cover thereof removed.
Figure 3:
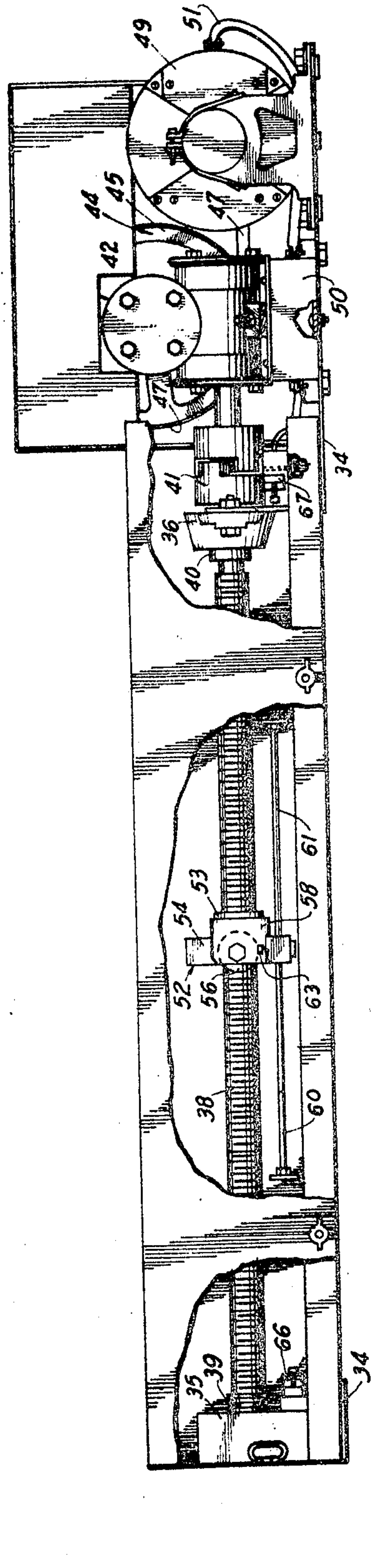
FIG. 3 is a side-elevational view of the curtain control apparatus, with portions of the cover broken away.
Figure 4:
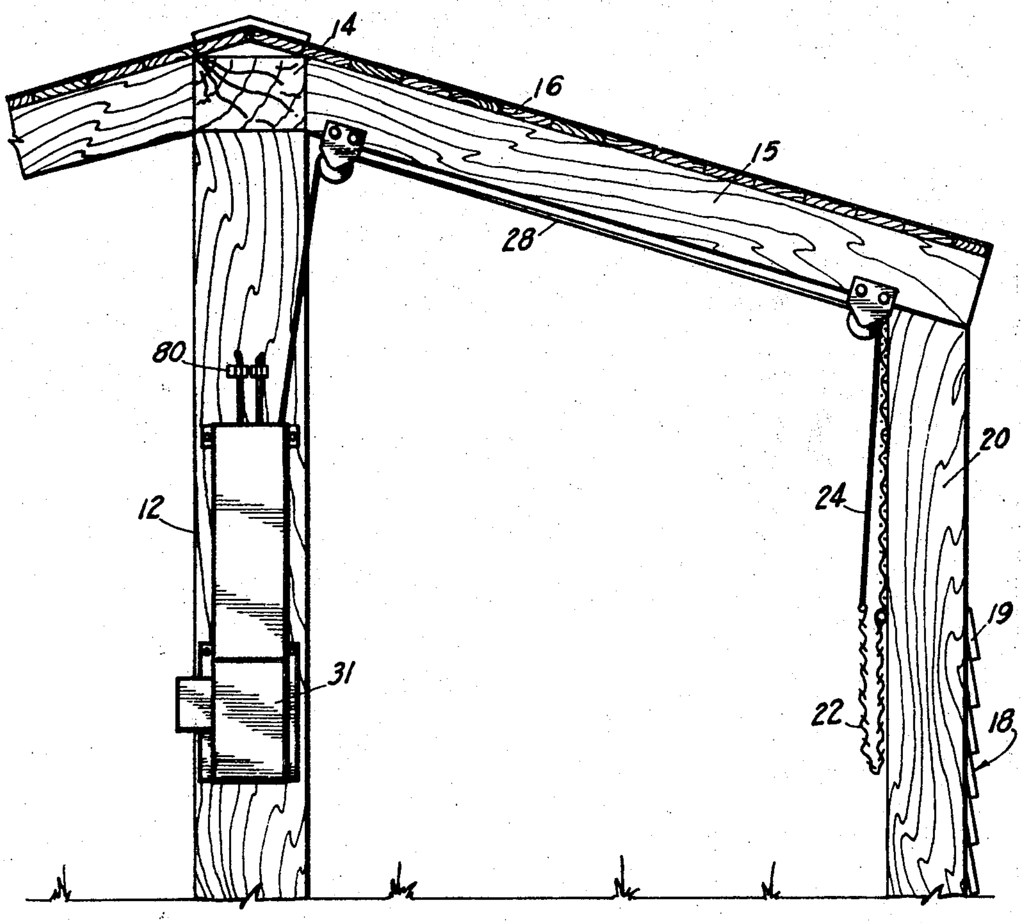
FIG. 4 is a schematic elevational view, with parts broken away, of the poultry house, showing the curtain control apparatus and cables associated therewith.

Referring now more particularly to the drawing, in which like numerals indicate like parts throughout the several views, FIG. 1 shows a poultry house 10 of conventional construction, including vertical side supports 11, vertical center columns 12, horizontal roof plates 13 and ridge beam 14. The plurality of rafters 15 extend from plates 13 to ridge beam 14, and the roof 16 of the poultry house is supported by rafters 15. The walls 18 of the poultry house are fabricated in the lower portion 19 with clapboard or other conventional construction, and are left open in the upper portion 20. Screen 21 extends over the opening of walls 18, to retain the chickens inside the poultry housing and allow air to pass into the poultry house.

Curtains 22 are connected to the upper edge of the solid lower portion 19 of wall 18, and are arranged to be raised by cables 24 to substantially close the upper open portion 20 of wall 18. As is shown in FIG. 1, a plurality of pulleys 25 are attached to horizontally extending plates 13 at spaced intervals therealong, and cables 24 extending from curtains 22 are extended over pulleys 25. The cables extending from pulleys 25 are connected together by clamping elements 26 (FIG. 1) on each side of the poultry house. Control cables 28 are clamped to the other side of clamping elements 26 and extend through pulleys 29 connected to horizontally extending plate 13, through pulleys 30 connected to one of rafters 15, and extend into curtain control assembly 31. Thus, when control cables 28 are moved through their pulleys 29 and 30, curtain cables 24 will function to raise or lower curtains 22.

Curtain control assembly 31 is vertically oriented and connected to the endmost central column 12. Curtain control assembly 31 includes a support plate 32 which is attached to column 12 by means of support brackets 34. Bearing brackets 35 and 36 are spaced from each other and connected to support plate 32, and threaded shaft 38 is supported in bearing brackets 35 and 36 by bearing assemblies 39 and 40. Slotted coupling 41 connects shaft 38 to gear reducer 42. Belt drive 44, including sheaves 45 and 46 and V-belt 47, connects gear reducer 42 with motor 49. Motor 49 is electrically connected to junction box 50 through conductors 51.

Pull block assembly 52 is mounted on threaded shaft 38, and comprises threaded socket 53 surrounding shaft 38 and yoke or collar 54 connected to socket 53. Control pulleys 55 and 56 are freely rotatably connected to yoke 54 by brackets 58 and 59. Control cables 28 from opposite sides of the poultry house extend about pulleys 55 and 56, and are anchored to column 12. Control rods 60 and 61 are adjustable connected to opposite ends of yoke 54, and set screws 62 and 63 rigidly fasten control rods 60 and 61 to yoke 54. Limit switches 66 and 67 are positioned at the ends of threaded shaft 38, each in a position to be engaged by control rods 60 and 61, respectively, when pull block assembly 52 reaches the upper or lower end of shaft 38.

Figure 5:
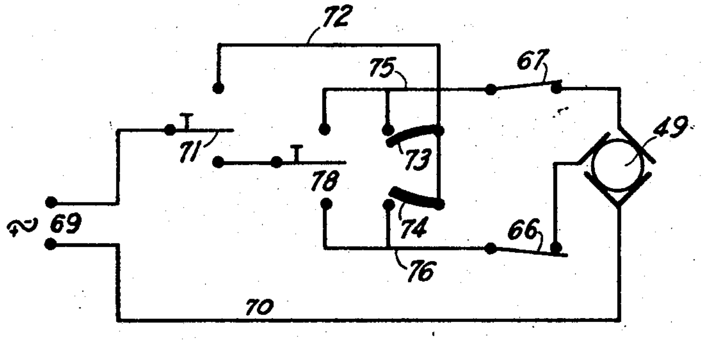
FIG. 5 is a schematic view of the electric control system of the curtain control apparatus.

As is best shown in FIG. 5, the circuitry for controlling motor 49 comprises source 69, and conductor 70 extending from one side of source 69 to motor 49. Auto-manual switch 71 is a double-throw switch, and its pivotal terminal is connected to the other side of source 69. Switch 71 is connectable to conductor 72, which leads to bimetallic switches 73 and 74. Switches 73 and 74 are controlled by the temperature surrounding the curtain control apparatus, and are connectable to conductors 75 and 76, respectively, which are connectable to motor 49 through previously described limit switches 66 and 67. Manual control switch 78 has its pivotal terminal connected to one of the terminals of double-throw switch 71 and is connectable to either conductor 75 or 76.

With the schematic diagram of FIG. 5, it can be seen that if it is desired to operate motor 49 automatically, that is, in response to temperature changes surrounding curtain control apparatus 31, switch 71 is moved into contact with conductor 72. When the temperature in the poultry house exceeds a predetermined limit, bimetallic switch 73 will move into contact with conductor 75 to drive motor 49 in a first direction, which functions to lower curtains 22. After the temperature in the poultry house decreases to an acceptable level, bimetallic switch 73 will move out of contact with conductor 75, and operation of motor 49 will cease. When the temperature in the poultry house drops below an acceptable level, bimetallic switch 74 will move into contact with conductor 76, and motor 49 will be driven in the opposite direction, thus raising curtain 22.

If it is desired to operate the curtains manually, that is, without regard to the temperature in the poultry house, switch 71 can be moved out of connection with conductor 72 and into connection with switch 78. Switch 78 can then be manipulated to contact either conductor 75 or 76, to drive motor 49 in the desired direction.

Limit switches 66 and 67 function to open the circuit made to motor 49 when the curtain has been completely raised or completely lowered, to prevent further raising or lowering of the curtain even though the by-metallic arm 73 or 74 is still in contact with its conductor 75 or 76.

The ends of control cable 28 are anchored by means of brackets 80 or similar devices to column 12, at a position above curtain control apparatus 31. Thus, movement of pull-block assembly 52 a given distance results in control cables 28 and their curtains 22 moving twice the given distance. It has been determined that the curtains should be moved within a speed range from ½ to 4 inches per minute in order that the control mechanism avoid hunting, and in order that the control mechanism keep up with rapid temperature changes. The particular control mechanism disclosed herein operates to raise and lower curtains 22 at a rate of 1⅔ inches per minute.

Bimetallic arms 73 and 74 are adjusted to come into contact with conductor 75 or 76 at plus or minus three degrees Fahrenheit on each side of the desired temperature for the poultry house. For instance, if the desired temperature for the poultry house was set at 75° Fahrenheit, the curtains would be lowered when the temperature reached 78°, or raised when the temperature reached 72°. Of course, bimetallic switches 73 and 74 can be adjusted to narrow the acceptable range of temperatures, or set for another range of temperatures.

Motor 49, gear reducer 42, and belt drive 44 are arranged so that motor 49 operates at a relatively high r.p.m. while shaft 38 operates at a relatively low r.p.m. thus providing the required torque to operate shaft 38. The slow operation of shaft 38 results in a minimum of hunting of the desired temperature within the poultry house. The speed of rotation of shaft 38 is fast enough so that when abrupt atmospheric temperature changes are experienced the temperature within the poultry house will be maintained to a substantial extent.

At this point, it will be noted that the curtain control mechanism disclosed herein is constructed in such a manner that it requires a minimum of moving parts and a minimum of sensitive parts to carry out its function. The construction of the control apparatus without the sensitive and expensive timer usually required reduces the initial cost and continual maintenance of the apparatus and frequent breakdown normally experienced with those devices utilizing a timer.

While a particular circuit has been set forth herein as controlling the operation and direction of rotation of motor 49, it should be understood that various other circuits might be utilized. The basic requirements of such a circuit are merely that it functions to drive the motor in opposite directions at opposite ends of the desired temperature range.

It will be obvious to those skilled in the art that many variations may be made in the embodiment chosen for the purpose of illustrating the present invention without departing from the scope thereof.

I claim:

1. In a poultry house of the type having at least partially open side walls and curtains for selectively opening or closing the sidewall openings, the improvement therein of a rotary drive mechanism supported upon the house, an upwardly extending threaded shaft connected to and rotatable with the rotary drive mechanism, an internally threaded collar means engaging the shaft and movable lengthwise of the shaft upon rotation of the shaft, cable means for connection at one end to the curtains and connected to the collar means, and control means for rotating the drive mechanism in response to temperature changes within the poultry house, said control means including means for energizing the drive mechanism to continuously rotate the threaded shaft in one direction in response to a temperature level in the poultry house above a given range until the temperature level is decreased to the given range and means for energizing the drive mechanism to continuously rotate the threaded shaft in the other direction in response to a temperature level in the poultry house below a given range until the temperature level is increased to the given range, and means for terminating the rotation of the drive mechanism in response to the position of the collar means on the shaft, wherein said drive mechanism, said threaded shaft, said collar and said cable means are constructed and arranged to raise or lower the curtains at a speed greater than ½ inch per minute and less than 4 inches per minute.

2. In a poultry house of the type having at least partially open side walls and curtains for selectively opening or closing the sidewall openings, the improvement therein of a rotary drive mechanism supported upon the house, an upwardly extending threaded shaft connected to and rotatable with the rotary drive mechanism, an internally threaded collar means engaging the shaft and movable lengthwise of the shaft upon rotation of the shaft, cable means for connection at one end to the curtains and connected to the collar means, and control means for rotating the drive mechanism in response to temperature changes within the poultry house, said control means including means for energizing the drive mechanism to continuously rotate the threaded shaft in one direction in response to a temperature level in the poultry house above a given range until the temperature level is decreased to the given range and means for energizing the drive mechanism to continuously rotate the threaded shaft in the other direction in response to a temperature level in the poultry house below a given range until the temperature level is increased to the given range, and means for terminating the rotation of the drive mechanism in response to the position of the collar means on the shaft, wherein said collar means includes at least one pulley member movable with the collar means along the threaded shaft, said cable means extending around the pulley member and having the end thereof remote from the end for connection to the curtains anchored, whereby movement of the collar means through a given distance results in movement of a portion of the cable means through twice the given distance.

3. The invention of claim 1 wherein said means for terminating the rotation of the drive mechanism comprises a limit switch electrically connected to said control means and located adjacent one end of said threaded shaft and another limit switch electrically connected to said central means and located adjacent the other end of said threaded shaft, and said collar means including means for engaging the limit switches.

4. In a poultry house of the type having at least partially open side walls and curtains for selectively opening or closing the sidewall openings, the improvement therein of a rotary drive mechanism supported upon the house, an upwardly extending threaded shaft connected to and rotatable with the rotary drive mechanism, an internally threaded collar means engaging the shaft and movable lengthwise of the shaft upon rotation of the shaft, cable means for connection at one end to the curtains and connected to the collar means, and control means for rotating the drive mechanism in response to temperature changes within the poultry house, said control means including means for energizing the drive mechanism to continuously rotate the threaded shaft in one direction in response to a temperature level in the poultry house above a given range until the temperature level is decreased to the given range and means for energizing the drive mechanism to continuously rotate the threaded shaft in the other direction in response to a temperature level in the poultry house below a given range until the temperature level is increased to the given range, and means for terminating the rotation of the drive mechanism in response to the position of the collar means on the shaft, wherein said means for terminating the rotation of the drive mechanism comprises a limit switch electrically connected to said control means and located adjacent one end of said threaded shaft and another limit switch electrically connected to said central means and located adjacent the other end of said threaded shaft, and said collar means including means for engaging the limit switches, wherein said means for engaging the limit switches comprises a pair of control rods connected to said collar means and adjustable with respect with said collar means toward and away from the limit switches.

5. In a poultry house of the type having at least one partially open side wall, curtains for closing the opening of the side wall, and cables connected to the curtains, the improvement therein of control means for connection to the cables to raise or lower the curtains at a rate greater than ½ inch per minute and less than 4 inches per minute, wherein said control means includes means responsive to an increase or decrease in temperature above or below a given range of temperature within the poultry house to continuously raise or lower the curtains until the temperature within the poultry house reaches the given range of temperature.

6. A method of controlling the temperature of a poultry house of the type having partially open walls and curtains for opening and closing the wall openings comprising:

continuously moving the curtains into closing relationship with the wall openings at a rate greater than ½ inch per minute and less than 4 inches per minute when the temperature in the poultry house is below a desired temperature range until the curtains completely close the wall openings or until the temperature in the poultry house reaches the desired temperature range, and continuously moving the curtains into opening relationship with the wall openings at a rate greater than ½ inch per minute and less than 4 inches per minute when the temperature in the poultry house is above the desired temperature range until the curtains completely open the wall openings or until the temperature in the poultry house reaches the desired temperature range.

References Cited

UNITED STATES PATENTS

| | | | |
|---|---|---|---|
| 1,471,454 | 10/1923 | Dolan et al. | |
| 2,149,481 | 3/1939 | Van Bosch et al. | 160—170 |
| 3,042,001 | 7/1962 | Dubie et al. | 119—21 |

HUGH R. CHAMBLEE, Primary Examiner

U.S. Cl. X.R.

160—170